US005675650A

United States Patent [19]

Cordery et al.

[11] Patent Number: 5,675,650

[45] Date of Patent: Oct. 7, 1997

[54] CONTROLLED ACCEPTANCE MAIL PAYMENT AND EVIDENCING SYSTEM

[75] Inventors: Robert A. Cordery, Danbury; Linda V. Gravell, Guilford; Leon A. Pintsov, West Hartford; Monroe A. Weiant, Jr., Trumbull, all of Conn.

[73] Assignee: Pitney Bowes Inc., Stamford, Conn.

[21] Appl. No.: 432,733

[22] Filed: May 2, 1995

[51] Int. Cl.[6] .......... H04L 9/00

[52] U.S. Cl. .......... 380/23; 380/9; 380/29; 380/30; 380/49; 380/51; 380/55; 364/464.11; 364/464.15

[58] Field of Search .......... 380/3, 4, 9, 49, 380/51, 54, 55, 59, 23, 29, 30; 364/464.02, 464.11–464.19, 464.2, 464.21

[56] References Cited

U.S. PATENT DOCUMENTS

| | | | |
|---|---|---|---|
| 3,938,095 | 2/1976 | Check, Jr. et al. | 364/464.02 |
| 4,660,221 | 4/1987 | Dlugos | 380/23 |
| 4,757,537 | 7/1988 | Edelmann et al. | 380/51 |
| 4,775,246 | 10/1988 | Edelmann et al. | 380/23 |
| 4,780,828 | 10/1988 | Whisker | 364/464 |
| 4,829,568 | 5/1989 | Clark et al. | 380/23 |
| 4,831,555 | 5/1989 | Sansone et al. | 364/519 |
| 4,837,701 | 6/1989 | Sansone et al. | 364/464.03 |
| 4,853,864 | 8/1989 | Hart et al. | 364/464.02 |
| 4,873,645 | 10/1989 | Hunter et al. | 364/464.02 X |
| 4,888,803 | 12/1989 | Pastor | 380/51 |
| 4,907,161 | 3/1990 | Sansone et al. | 364/464.02 |
| 5,390,251 | 2/1995 | Pastor et al. | 380/21 |
| 5,454,038 | 9/1995 | Cordery et al. | 380/23 |

FOREIGN PATENT DOCUMENTS

| | | | |
|---|---|---|---|
| 0647925 | 4/1995 | European Pat. Off. | G07B 17/04 |

OTHER PUBLICATIONS

*The Oxford English Dictionary*, (Clarendon Press; Oxford, UK; 1989; Second Edition), Entry for "Indicium" on p. 862 of vol. VII.

*Primary Examiner*—Bernarr E. Gregory
*Attorney, Agent, or Firm*—Charles R. Malandra, Jr.; David E. Pitchenik; Melvin J. Scolnick

[57] ABSTRACT

A method for controlled acceptance mail payment and evidencing in accordance with the present invention includes creating a mail batch with a plurality of mailpieces each having encrypted indicia printed thereon. A mail documentation file is created containing the total weight of the mail batch, the total payment for the mail batch and mailer identification, all of which are digitally signed to facilitate a subsequent verification of the integrity of the data. The digital signature is included as part of the mail documentation file. The mail batch and mail documentation file are submitted to a carrier distribution system. The carrier processes the batch of mail and the mail documentation file as part of the carrier distribution process to determine the total weight of the batch of mail and verify the weight of the actual batch of mail in comparison to the total weight of the batch of mail as set forth in the mail documentation file.

12 Claims, 7 Drawing Sheets

FIG. 7

| | | | | |
|---|---|---|---|---|
| MDF# 00001 | MAILER ID 1234 | VAULT ID 1234567 | PIECE COUNT 0001 TO 01410 | MAILER ACCOUNT 775532 |
| DATE 11 APRIL, 95 | RATING TABLE 987654 | SIGNATURE 01234567 | ERROR CONTROL 001234321 | |
| WEIGHT (OZ.) | SIZE | DISCOUNT | POSTAGE | NUMBER OF PIECES |
| 0.5 | STANDARD | FULL | $0.32 | 731 |
| 1.0 | SURCHARGE | NON-PRESORT | $0.55 | 27 |
| 1.7 | STANDARD | PRE-BARCODED | $0.57 | 567 |
| 1.8 | SURCHARGE | PRESORT | $0.75 | 85 |
| 94.34 LB | TOTALS | | $635.71 | 1410 |

704, 714, 706, 716, 708, 718, 712, 720, 710, 722, 724, 702, 726, 728

FIG. 8

808

| CONTROLLER MAILPIECE RECORD NO. | VAULT | PIECE COUNT | POSTAGE | INDICIA DATE | ADDRESS FROM INSERTER CONTROLLER QUEUE | ISSUE TIMES | MAILPIECE RECORD SIGNATURE |
|---|---|---|---|---|---|---|---|
| 37 | 1234567 | 01234 | 0.32 | 04/11/94 | JOHN SMITH 35 MAIN ST. ANYTOWN, CT 06001 | 2 | 135791113 |
| 37 | 1234567 | 01234 | 0.32 | 04/11/94 | JOHN SMITH 35 MAIN ST. ANYTOWN, CT 06001 | 3 | 445678128 |
| 121 | 2345678 | 01298 | 0.57 | 04/11/94 | MARY JONES 54 RIVER RD. OTHERTOWN MA | 2 | 973249872 |
| 3 SPOILED | | | $1.21 REPRINTED | ERROR RECORD SIGNATURE: 98327634728793987324918 23 | | | |

804, 806, 818, 810, 812, 814, 802, 820, 816

CONTROLLED ACCEPTANCE MAIL PAYMENT AND EVIDENCING SYSTEM

FIELD OF THE INVENTION

The present invention pertains to mail payment and evidencing systems and, more particularly, to a mail payment and evidencing system which is adapted to be employed with a batch of mail prepared by a mailer and processed by a carrier as part of the mail distribution process.

BACKGROUND OF THE INVENTION

Various methods have been developed for payment of carrier services. These payment methods include postage stamps which are individually applied to each mailpiece and metered imprints which are also individually applied to each mailpiece. Additionally, other systems have been developed such as permit mail where a carrier issues a permit allowing certain types of mailing and manifest systems wherein mail is manifested and delivered to a carrier service along with the manifest.

In a mail production environment, where large batches of mail are produced, each of the above payment methods involves compromises between ease of use and security for the payment of postage to the carrier service. Stamped mail requires costly printing of stamps by the carrier service, as well as costly control and revenue accounting for the stamps. Moreover, the utilization of stamps as a payment method provides little information to the carrier service related to the cost associated with operating any particular facility or any particular class of mail delivery service provided. Additionally, the utilization of stamps particularly in a large mail production environment, does not easily accommodate multiple rate mailings. Mechanical dispensing of stamps is slow and prone to malfunction. The labor and time involved in purchasing of stamps by the mailer is costly, and security is limited due to theft, of stamps and reused or "washing" of stamps.

Traditional metered mail provides a significant level of security for the carrier service. However, in high volume production mail environment variable weight mailings may require multiple meters to achieve high throughput speeds and mechanical malfunctions may frequently occur for high volumes of mail printed by meters with mechanical printing mechanisms.

Many of these problems have been alleviated with the advent of new electronic postage meters, particularly postage meters which are adapted to print with digital printing technologies. Enhanced security has been obtained with postage meters with digital printing through the use of encrypted indicia. The encrypted indicias employ a digital token which is encrypted data that authenticates the value and other information imprinted on the mailpiece. Examples of systems for generating and using digital tokens are described in U.S. Pat. No. 4,757,537 for SYSTEM FOR DETECTING UNACCOUNTED FOR PRINTING IN A VALUE PRINTING SYSTEM; U.S. Pat. No. 4,831,555 for UNSECURED POSTAGE APPLYING SYSTEM; and, U.S. Pat. No. 4,775,246 for SYSTEM FOR DETECTING UNACCOUNTED FOR PRINTING IN A VALUE PRINTING SYSTEM. Because the digital token incorporates encrypted data including postage value, altering of the printed postage revenue and the postage revenue block is detectable by a standard verification procedure. Moreover, systems have been proposed for postal payment with verifiable integrity to detect attempts to interfere with the rating process for the postage amount to be imprinted as opposed to interference with the resulting printed postage value. In this connection, reference is made to U.S. patent application Ser. No. 08/133,398 filed Oct. 8, 1993 for Pintsov, Connell, Sansone and Schmidt for POSTAL RATING SYSTEM WITH A VERIFIABLE INTEGRITY, the disclosure of which is hereby incorporated by reference, now U.S. Pat. No. 5,448,641, and also in corresponding published European Patent Application Publication No. 0,647,925.

Both permit mail and manifest mail systems, as well as related contract mail systems, usually have no evidence of postage payment on individual mailpieces and require complex and extensive acceptance procedures and associated documentation. These systems are very complex, time consuming and inaccurate for the carrier service in administering and accepting mail. Moreover, the funds security of the system is vulnerable since it is open to undetectable collusion. Once permit mail has been accepted into the carrier mail delivery system, it is extremely difficult to determine whether the mail has been paid for. Furthermore, because of the various techniques used for payment adjustments, a significant loss of revenue or over payment by either the carrier or the mailer, as the case may be, is possible since payment is verified only by a sampling method. In addition, systems of this type are very complex for the mailer, are error prone and require extensive documentation. Further, the risk of overpayment by the mailer or the requirement to redo the documentation and mail due to adjustments exists in these systems. Additionally, the systems of this type involve time consuming costly acceptance procedures. Moreover, for certain of these permit payment systems, preprinted envelopes must be maintained in inventory.

An improved manifest system has been proposed, for example, as set forth in U.S. Pat. No. 4,907,161 for BATCH MAILING SYSTEM, U.S. Pat. No. 4,837,701 for MAIL PROCESSING SYSTEM WITH MULTIPLE WORK STATIONS; U.S. Pat. No. 4,853,864 for MAILING SYSTEM HAVING POSTAL FUNDS MANAGEMENT; and, U.S. Pat. No. 4,780,828 for MAILING SYSTEM WITH RANDOM SAMPLING OF POSTAGE.

SUMMARY OF THE INVENTION

It is an object of the present invention to provide an improved postage payment and evidencing system.

It is a further object of the present invention to provide an effective controlled acceptance process for such mail that includes improved flexibility for the mailer in creating mail and a high level of security for payment and evidencing of appropriate postage carrier service.

It is yet a further objective of the present invention to employ an encrypted digital token system for batch mail along with verification procedures in the acceptance of the mail to allow flexible preparation of mixed weight mail and security of carrier service payment funds.

A method for controlled acceptance mail payment and evidencing in accordance with the present invention includes creating a mail batch with a plurality of mailpieces each having encrypted indicia printed thereon. A mail documentation file is created containing the total weight of the mail batch, the total payment for the mail batch and mailer identification, all of which are digitally signed to facilitate a subsequent verification of the integrity of the data. The digital signature is included as part of the mail documentation file. The mail batch and mail documentation file are submitted to a carrier distribution system. The carrier processes the batch of mail and the mail documentation file as part of the carrier distribution process to determine the total weight of the batch of mail and verify the weight of the actual batch of mail in comparison to the total weight of the batch of mail as set forth in the mail documentation file.

BRIEF DESCRIPTION OF THE DRAWINGS

Reference is now made to the following Figures wherein like reference numerals designate similar elements in the various views and in which:

FIG. 7 is an example of a printed mail documentation file;

FIG. 8 is a depiction of a printed mail error recovery file;

DETAILED DESCRIPTION OF THE PREFERRED EMBODIMENT

Figure 1:
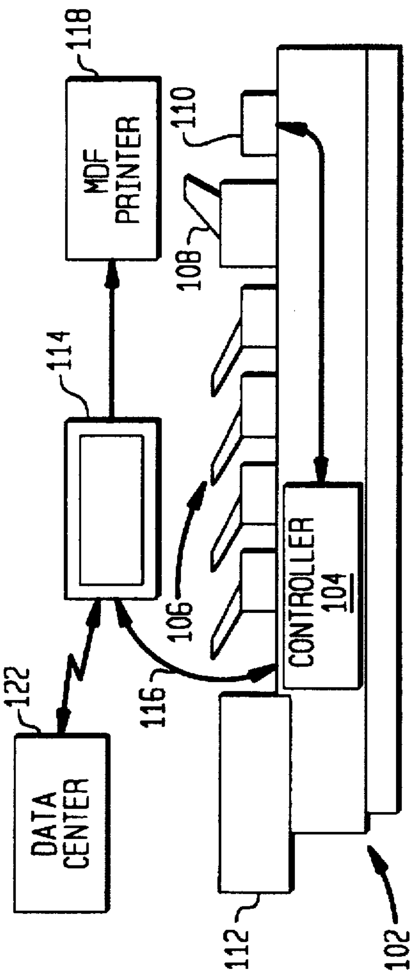
FIG. 1 is a diagrammatic depiction of a batch mail generation system employing the present invention and utilizing an inserter system adapted to imprint postal indicia.

Reference is now made to FIG. 1. An inserter system 102 includes a computer controller 104 for the inserter. The controller 104 controls both a plurality of feeder modules shown generally at 106, an envelope insertion module 108 and a printer 110. The controller 104 is further connected to a control document feeder module 112 and to a vault subsystem 114 by means of a bi-directional communication channel 116. The vault 114 is operatively connected to a non-secure report printer 118 utilized to print mail documentation files and to a securely coupled printer 120 for imprinting encrypted indicia on loose mail which is not part of a batch mail run.

In operation, under control of the inserter controller 104, control documents are fed from the control document feeder module 112 onto the inserter transport, (not shown). The control document determines the operation of the various feeder modules 106 to selectively feed inserts onto the transport to be assembled into a collation and inserted into an envelope fed from the envelope feeder 108. An assembled mailpiece, not shown, when it reaches printer 110 has an address printed on the envelope such as for non windowed mail. The assembled mailpiece now has to be imprinted with indicia by the printer 110. The indicia is encrypted indicia which includes a digital token provided by the vault 114. Printer 110 maybe a general purpose printer for suitable use with an insertion machine and may print other necessary and optional information such as delivery point postal bar code, advertising material, slogans, and the like. It should be expressly noted that many other organizations for insertion systems can be utilized with the present invention, for example, the feeder modules 106 can be directly controlled by the inserter controller 104 or the insertion process can be controlled via magnetic media such as floppy disks through the controller 104 as well as different printer arrangements.

The vault 114 is in communications with one or more data centers. A data center 122 is shown. The data center may be associated with providing the computer meter resetting system function for the vault 114. This is a function where carrier service funds are refilled into the vault 114 as carrier service payment evidencing is implemented through the printing of mailpieces thereby depleting stored carrier service funds in the vault. Moreover, the controller 104 or vault 114 may also be connected to a carrier service information center to provide logistics and payment information to the carrier service.

The vault 114 also drives a printer 118 to print a mail documentation file associated with each batch mail run generated by the inserter system 102. The vault 114 may be associated with a number of other inserter systems which may be generating a portion of the batch mail run where job splitting is required. Printer 118 is desirably of a high quality printer capable of printing various known types of bar code such as PDF 417 or Code 1, depending on the form of implementation of the system.

Figure 2:
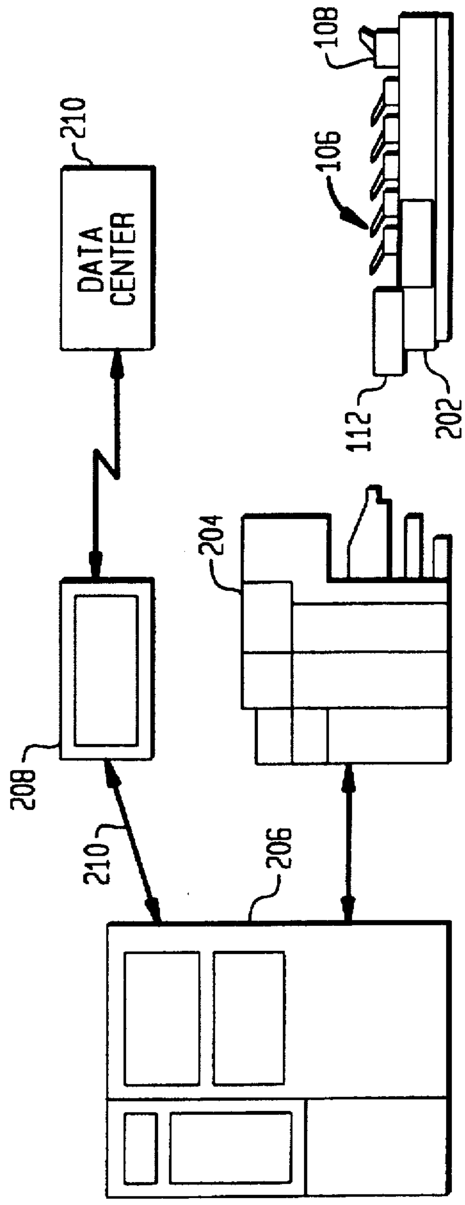
FIG. 2 is a diagrammatic depiction of an alternate embodiment of the system shown in FIG. 1 where the mailpiece indicia is preprinted prior to the insertion process.

References is now made to FIG. 2. An inserter system 202 similar to that shown in 102 is provided; however, no printer is provided as part of the inserter system for the purpose of implementing the present invention. A general purpose printer 204 is provided for printing the necessary control and other documents for assembly by the inserter system as well as for printing the mail documentation file. The printer is controlled by a computer 206 as for example a mini or main frame computer associated with creating various mailpieces. In this embodiment the encrypted indicia is printed by the printer 204 on the address bearing document. In such case, frequently, the address portion of the address bearing document is viewable through a window in the mailing envelope. The computer 206 is connected to a vault 208 by a bi-directional communication link 210. The various digital tokens associated with each mailpiece are provided by the vault 208 to the computer 204 for printing by the printer 204. The vault 208, similar to the vault in FIG. 1, is connected through a communications link to a remote data center 210 which provides the same functionality as previously noted.

Figure 3:
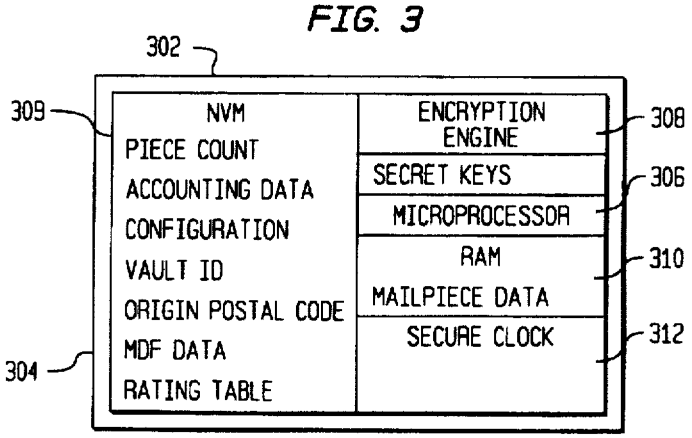
FIG. 3 is a block diagram showing greater detail of the vault elements including the encryption engine for executing the digital token transformation to generate digital tokens imprinted on each mailpiece.

Reference is now made to FIG. 3. A vault 302, which would be suitable for use as vault 114 shown in FIG. 1 or vault 208 shown in FIG. 2, includes a secure housing 304. Mounted within the secure housing is a microprocessor 306 operatively connected to an encryption engine 308 executing the encryption algorithm and holding secret keys necessary to generate the encrypted indicia. A non-volatile memory 309 stores information related to generating the encrypted indicia and digital token including the non-resettable piece count, accounting data, configuration data, vault identification, origin postal code, mail documentation file data and rating table. Additionally connected to the microprocessor is a random access memory containing mailpiece data and, if desired, a secure clock 312. The organization and operation of the vault 302 depends upon the particular system for encryption being implemented and various organizations of vaults and vault related data are suitable for use with the present invention.

Figure 4:
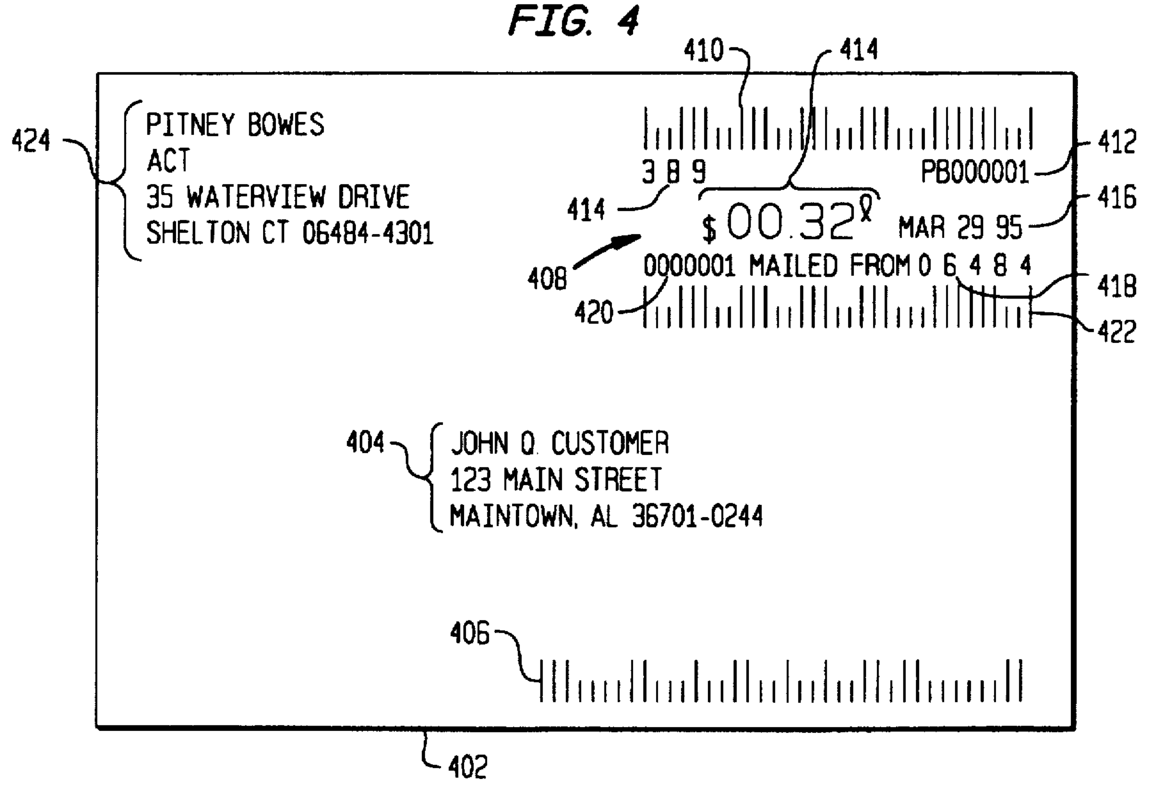
FIG. 4 is a mailpiece created in accordance with the present invention based on the system shown in FIG. 1.

Reference is now made to FIG. 4. A mailpiece 402 of the type which may be produced on the inserter system is shown in FIG. 1. The mailpiece contains addressee information shown generally at 404, a postal delivery point bar code 406 and encrypted indicia shown generally at 408. The encrypted indicia including the digital token can be formatted in many ways depending upon the requirements of the particular carrier service involved. Additionally, different information may be included or omitted from the encrypted indicia depending upon the needs and requirement of the carrier service. The encrypted indicia 408 includes a vault identification number bar code 410 shown in alphanumeric representation as PB000001 at 412. The indicia 408 further includes an imprinted number 389 shown at 414. The first digit "3" is an error correcting digit and the next two digits "8" and "9" are vendor and carrier service digital tokens, respectively. One suitable system for verification using two encrypted tokens is disclosed in U.S. Pat. No. 5,390,251 for MAIL PROCESSING SYSTEM INCLUDING DATA CENTER VERIFICATION FOR MAILPIECES. These digital tokens enable the carrier service or the vendor to separately authenticate the validity of the encrypted indicia 408. Moreover, the digital tokens can be precomputed. Reference is made to pending patent application Ser. No. 08/242,564 filed May 13, 1994 for ADVANCED POSTAGE PAYMENT SYSTEM EMPLOYING PRECOMPUTED DIGITAL TOKENS WITH ENHANCED SECURITY assigned to Pitney Bowes Inc., the disclosure of which is hereby incorporated by reference.

The encrypted indicia further includes the imprint of the postage amount for the mailpiece at 414, the date at 416, the originating postal code at 418, and the sequential piece count for the vault at 420. A bar code at 422 is a machine readable representation of piece count 420. A return address which also includes the originating postal code is shown at 424.

Figure 5:
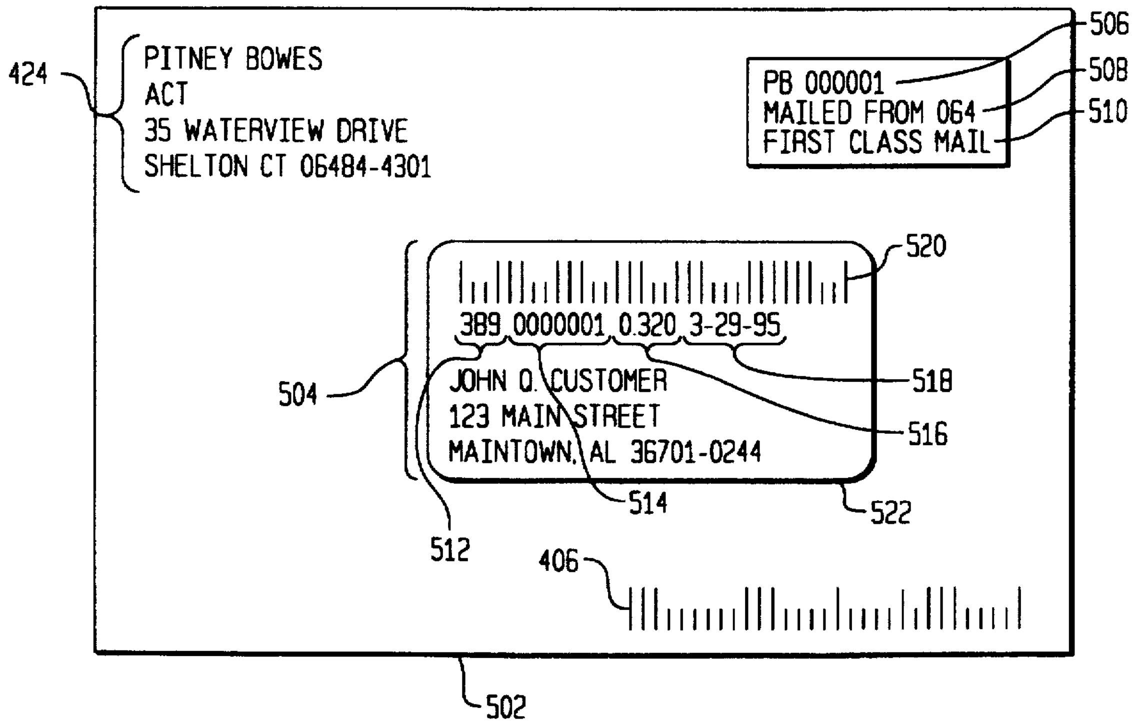
FIG. 5 is a mailpiece created in accordance with the present invention based on the system shown in FIG. 2.

Reference is now made to FIG. 5. A mailpiece 502 of the type which may be created on the system shown in FIG. 2 includes encrypted indicia printed in the address block 504 viewable through a window in the mailing envelope. The mailpiece contains a portion imprinted of the fixed information relating to the encrypted indicia imprinted on the envelope. This includes the vault identification at 506, the originating postal code or a portion thereof at 508 and an optional endorsement at 510 here, "First Class Mail".

The portion of the indicia in the address block includes the variable part of the information including the number "389" at 512 which includes, similar to FIG. 4, an error correcting code of "3", a first encrypted digital token of "8" and a second encrypted digital token of "9". A sequential piece count is shown at 514 and the postage amount at 516. The date of mailing is shown at 518. A bar code of both the piece count and the vault identification are shown at 520. This information is visible through a window 522 in the mailing envelope.

It should be expressly noted in connection with FIG. 4 and FIG. 5 that great flexibility can be provided in how the mailpiece itself is organized and how the encrypted indicia is organized depending upon the requirements of the carrier service. Many forms of implementation may be accomplished utilizing the present invention.

It should also be expressly noted that the particular encrypted indicia shown in connection with FIGS. 4 and FIGS. 5 do not include addressee information as part of the digital token encryption transformation. This is important because the inclusion of the addressee information into the digital token imprinted on the mailpiece to validate the mailpiece requires a synchronization between the mail insertion process and printing of the indicia. Thus, the address bearing document must precisely match the digital token imprinted on the mailpiece. In accordance with the present embodiment of the invention, this is not required (although if desired could be implemented) because a high level of funds security is provided without this feature. Thus, a digital token can be imprinted on the mailpiece with all the information necessary to validate the indicia is contained in the indicia itself and is independent of addressee information. However, it should be also further noted that in the embodiment shown in FIG. 2 and the associated mailpiece shown in FIG. 5, if desired, addressee information can easily be included in the digital token since the delivery address imprinting and the digital tokens imprinting are accomplished during the same printing process.

Figure 6:
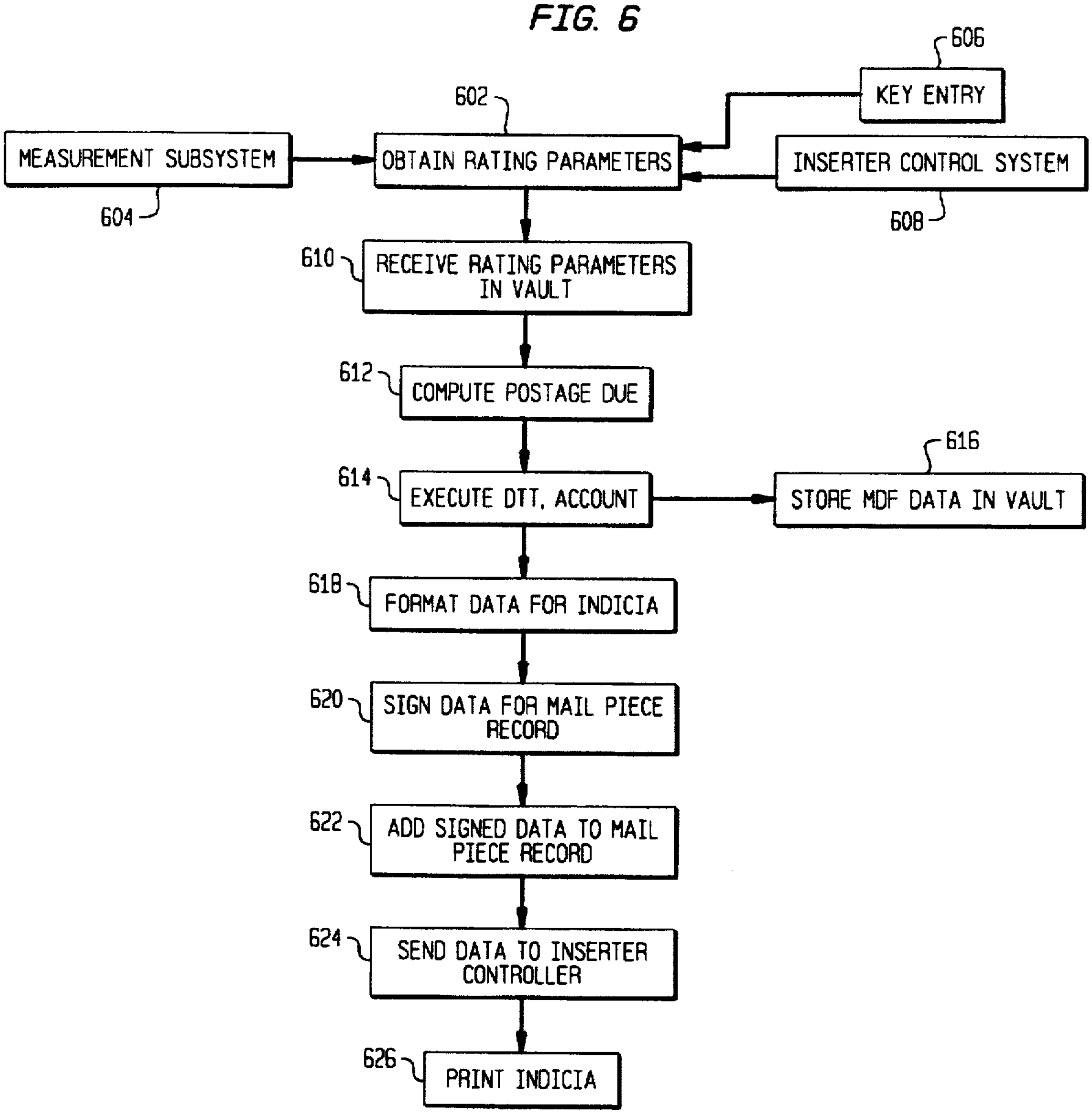
FIG. 6 is a flow chart of the mail preparation process in accordance with the present invention.

Reference is now made to FIG. 6. In creating a batch of mailpieces, for every mailpiece in the batch of mail, rating parameters are obtained at 602. These rating parameters may come from either a measurement subsystem 604, manual key entry at 606, for example, for imprinting loose mail, and from the inserter control system at 608. The rating parameters are received in the vault at 610 where the postage due is computed at 612. The digital token transformation is executed and accounting is implemented at 614 by the vault. The accounting information and digital token are stored at 616 for utilization in the mail documentation file. The data for the indicia is formatted at 618 if desired for use as part of a error recovery process described hereinafter, the data for the mailpiece record may be digitally signed at 620 and added to the mailpiece record at 622. This data is sent to the inserter controller (of FIG. 1) at 624 and at 626 the indicia is printed on the mailpiece.

While a detailed flow chart of the operation of the system shown in FIG. 2 is not included, the operation of the system shown in FIG. 2 is similar to that described above in connection with FIG. 1 except to accommodate minor differences in the architectural arrangement of the components and indicia organization.

Reference is now made to FIG. 7. A printed mail documentation file is shown at 702. This file is submitted to the carrier service with the batch of mail and plays a critical role in the acceptance procedure. The file 702 can be provided to the carrier service either as a printed document or electronically or on a storage medium.

The mail documentation file includes the mail documentation file serial number at 704, a mailer identification at 706, a vault identification at 708 and a mailer account at 710, if desired. Each mailer may have several different accounts for use in different applications and each account may have several different vaults associated with it. A piece count for the mail run is also provided at 712. In the particular run documented by the mail documentation file 702 1,410 mailpieces were produced for submission as the batch. Also provided as part of the mail documentation file is the date of submission at 714, the identification of the rating table employed at 716. It should be noted that the rating table identification may be a truncated encrypted hash code of the rating table employed in a manner described in the above noted application for POSTAL RATING SYSTEM WITH VERIFIABLE INTEGRITY filed Oct. 8, 1993, U.S. patent application Ser. No. 08/133,398 for Pintsov, Connell, Sansone and Schmidt and assigned to Pitney Bowes Inc.

A digital signature of the entire mail documentation file is provided at 718 and an error control code at 720 to facilitate error detection and correction when machine reading the mail documentation file.

The mail documentation file further contains information for groups of mailpieces which are similar in weight, size, discount, and postage. For example, on line one at 722, 731 pieces with postage value of 32 cents the full postage rate, of the standard size and with an actual weight of 5/10 of an ounce are listed. Similarly, in the following entries various groups of mailpieces having similar weight, size, discount and postage are listed. The various totals, such as the total weight of the mailpieces in the batch are provided at 724 along with the total postage at 726 and the total number of mailpieces at 728.

Because the mail documentation file 702 contains a digital signature at 718, the total weight for the mail run at 724 as well as the number of pieces at 728 and other data within the mail documentation file cannot be undetectably altered. This provides a method for verifying the integrity of the data in the mail documentation file 702.

The process of creating the mail documentation file 702 can be modified to create a tray documentation file and corresponding encrypted tray labels for trays and other containers that are used for mail packaging. In particular, during a mail generation process information needed for mail packaging is frequently available to inserter, for example, to inserter controller 104 shown in FIG. 1. In this case, the inserter controller 104 communicates the "end of tray" information to the vault 114. The vault 114 then generates a necessary tray documentation data similar to the data in the mail documentation file, for example, the number of mail pieces of different weight and postage denominations that are contained in the tray as well as the total weight of mailpieces in the tray. After that, the vault 114 computes the digital signature of tray documentation file by using the same secret key that is used for digital token computation. The digitally signed tray documentation file is printed in the form of a tray label such as the printer 118 shown in FIG. 1.

Tray labels produced in such fashion are then scanned during acceptance and verification procedure, which may if desired, be made part of the procedure described in connection with FIG. 10. For example, a hand held scanner may be employed. Such scanner may be operatively connected to the personal computer 1002 and the secure processor 1008 hereinafter described in connection with FIG. 10. This method allows for simplification of verification procedures in the case of large mailings containing many trays (or other suitable containers) and when the verification based on the mail documentation fie relating to the entire mailing can be cumbersome.

Reference is now made to FIG. 8. Since mailers from time to time desire refunds for spoiled mailpieces, a refund process and accounting procedure is desirably included in postage payment and evidencing systems. In the above described system, the spoiled mailpieces such as mailpieces destroyed by the insertion equipment can be simply reprinted by using the indicia data stored in the inserter controller memory and included as part of the mail run. Fraudulent "salting" of the mail run is detected by the process of weighing the mailpieces batch upon acceptance as it will be described hereinafter and, when desired, statistical sampling.

Another method for recovery of funds for spoiled mailpieces involves a system where the digital token may not be reprinted without being accounted for by the vault system. In systems of this type the indicia printer are securely coupled either by physical security or by encryption security to the accounting vault. With regard to such systems, reference is made to the mail error recovery file shown in FIG. 8 which may be used in a system wherein the indicia have been reprinted.

Error recovery documentation file 802 includes information concerning the specific mailpiece which has been reprinted. The reprinting process may occur more than once if a reprinted mailpiece, for example, is destroyed during the reprinting process. The present system allows for accounting for such further reprinting. As for example, a controller mailpiece record number 37 is shown at 804 and 806. This is for a mailpiece printed by a particular vault with a particular piece count, with a particular postage and a particular data shown generally at 808 in connection with record number 37. The mail error recovery documentation file 802 also includes, as noted in the mailpiece record obtained from the inserter controller, the address to which the mailpiece is being sent at 810 and 812.

It should be noted that the above noted information is obtained by knowing the point at which the mail run stops and by checking the controller queue to resume operation of the inserter run from that queue point which thus provides the necessary addressee information. The mailpiece record signature is included at 814 and 816. It should be noted that the mail record signature differs for each of the records because the issue times are different as can be seen for the second issue in the first line of entry and for the third issue in the second line of entry. A further example is provided for a mailpiece record number 121 at 818 where the indicia was issued twice. The entire mail error recovery documentation file is signed at 820 to allow authentication of the integrity of the data provided in the file. This makes modification of the mailer recovery documentation file 802 detectable.

Figure 9:
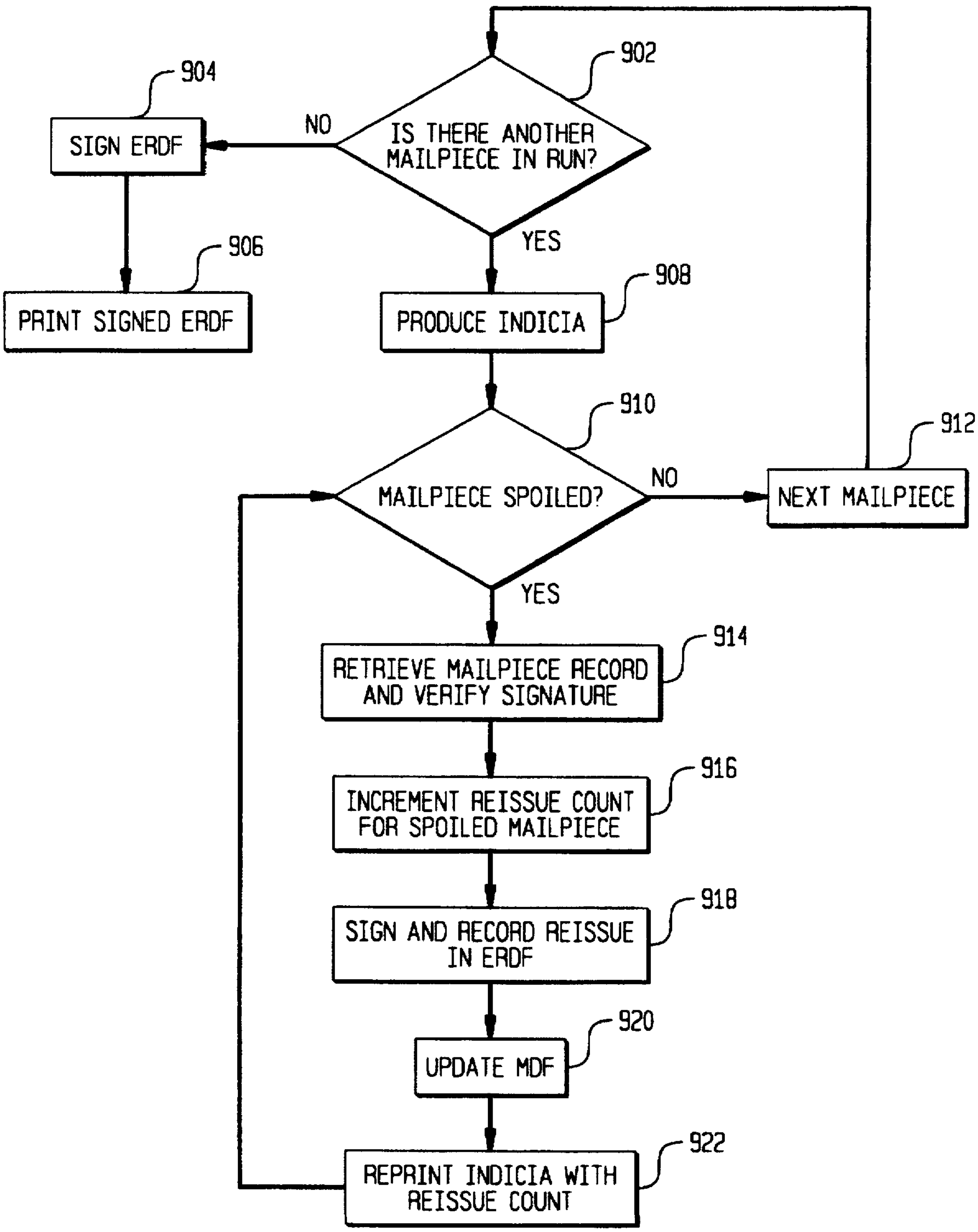
FIG. 9 is a flow chart of collecting error data for the mail error recovery file shown in FIG. 8.

Reference is now made to FIG. 9 which represents a flow chart for generation of the error recovery data file. A determination is made at 902 if there is another mailpiece in the run. If there are no further mailpieces in the run an error record is signed at 904 and the signed error recovery documentation file is printed at 906. If, on the other hand, there are other mailpieces in the run indicia is produced at 908. A determination is thereafter made at 910 if the mailpiece is spoiled. If not, the next mailpiece is processed at 912.

If the mailpiece is spoiled, the mailpiece record is retrieved and the signature verified at 914. The reissue count for the spoiled mailpiece is incremented at 916 and the reissue record in the error recovery documentation file is signed at 918. The mail documentation file is updated at 920 and the indicia with reissue count reprinted at 922. At this time, the process loops back to determine whether or not the reprinted mailpiece was spoiled again.

Figure 10:
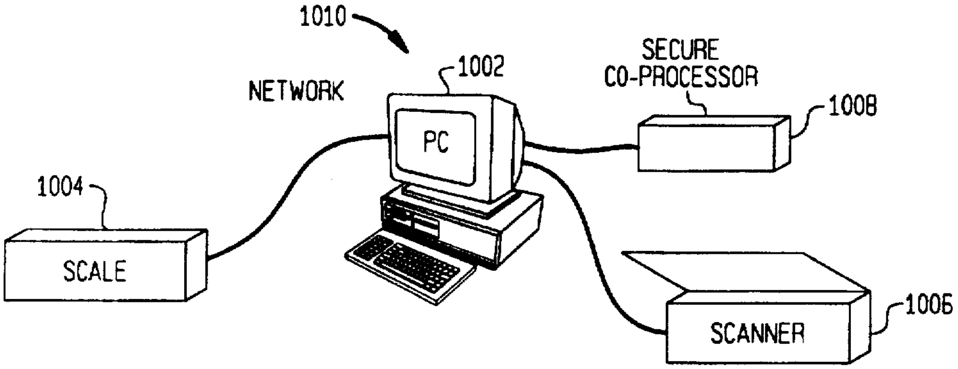
FIG. 10 is a carrier acceptance unit verification system embodying aspects of the present invention and suitable for use with the systems shown in the foregoing FIGURES.

Reference is now made to FIG. 10, which shows a postal acceptance unit verification system. The system includes a personnel computer 1002 connected to a scale 1004, a scanner 1006 and a secure co-processor 1008. The secure co-processor provides an encryption engine, similar to the vault system, used in the mail generation process by the mailer service. The encryption process is identical to the encryption process implemented by a vault in enabling a recomputation of the digital token based on the data provided in the indicia. In operation the mail documentation file can be entered into the personnel computer 1002.

The personal computer may, if desired, verify the digital signature and the data on the mail documentation file 702 to ensure that the data has not been altered. As part of processing the digital signature, the same encryption engine may be used to both generate and verify the digital signature. In this manner, only a single encryption engine is required and the management of the encryption keys for both generating the encrypted indicia and digital signature for the various documentation files 702 and 802 is minimized. Thus, desirably, the same secret key can be utilized for both generating the encrypted digital tokens and the digital signature of documentation files 701 and 802. As part of the verification process, when a mail batch is submitted to the carrier service, the total mail batch is weighed by scale 1004 and the data is input to the PC 1002. This information is compared against the information contained in the mail documentation file 702 to determine consistency as will be hereinafter explained in detail. Moreover, the scanner 1006 can be used to scan sample portions of the mail pieces to verify the indicia as well as to verify the readability and deliverability of the address information and bar codes. Furthermore, the scale 1004 can also be used to sample weights of specific mailpieces. Alternatively, rather than employ a scanner 1006, the mail documentation file 702 and the mail error recovery documentation file 802 can be communicated via a communication link 1010 directly into the personal computer 1002.

The carrier acceptance process is performed in two steps. The first step is directed at detecting and ultimately preventing (through a strong deterrence effect) illegal copying of encrypted postal indicia. It is performed by first scanning the postal mail documentation file and verifying the integrity of information and then comparing the actual measurable total weight of submitted batch of mail with a total weight indicated in the mail documentation file. Any significant discrepancy (e.g. a difference larger than a pre-defined threshold, for example, equal to two to three times the weighing accuracy of the scale) may indicate the presence of unpaid and unaccounted mailpieces in the mail run submitted for acceptance. The second phase of the verification process is directed at detecting counterfeit mailpieces by sampling various mailpieces in the batch of mail. Thus, both duplication and counterfeiting are detected by the mail acceptance process.

Figure 11:
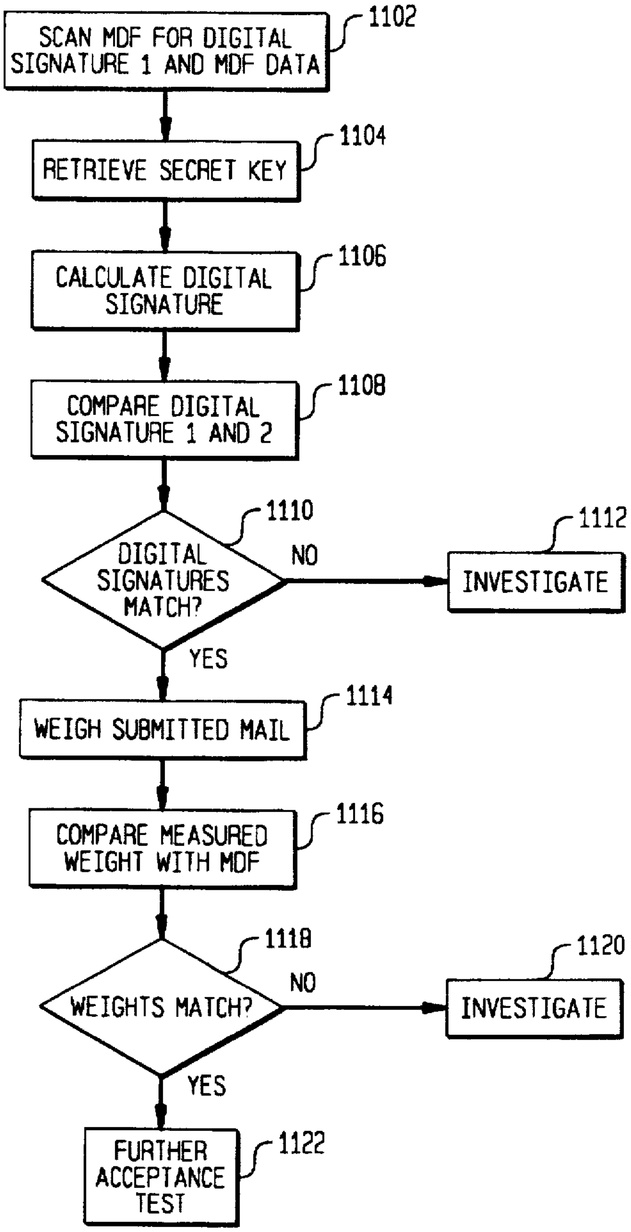
FIG. 11 is a flow chart of the carrier service acceptance process in accordance with the present invention; and, FIG. 12 is a flow chart of the mailpiece verification process depicting aspects of the present invention.

Reference is now made to FIG. 11. The mail documentation file is scanned at 1102 for digital signature and for mail documentation file data. At 1104 the secret key by which the mail documentation file was signed is retrieved and the digital signature verified at 1106. The digital signature scanned from 1102 and calculated from 1106 are compared at 1108. A determination is made at 1110 whether the signatures match. If no match is found, an investigation is initiated at 1112.

If the signatures match, the mail batch is weighed at 1114. The total weight of the mail batch which is then compared against the weight reported on the mail documentation file at 1116. A determination is made at 1118 if the weights match. If the weights do not match an investigation is initiated at 1120. If the weights do match, a further acceptance testing may be implemented at 1122.

Figure 12:
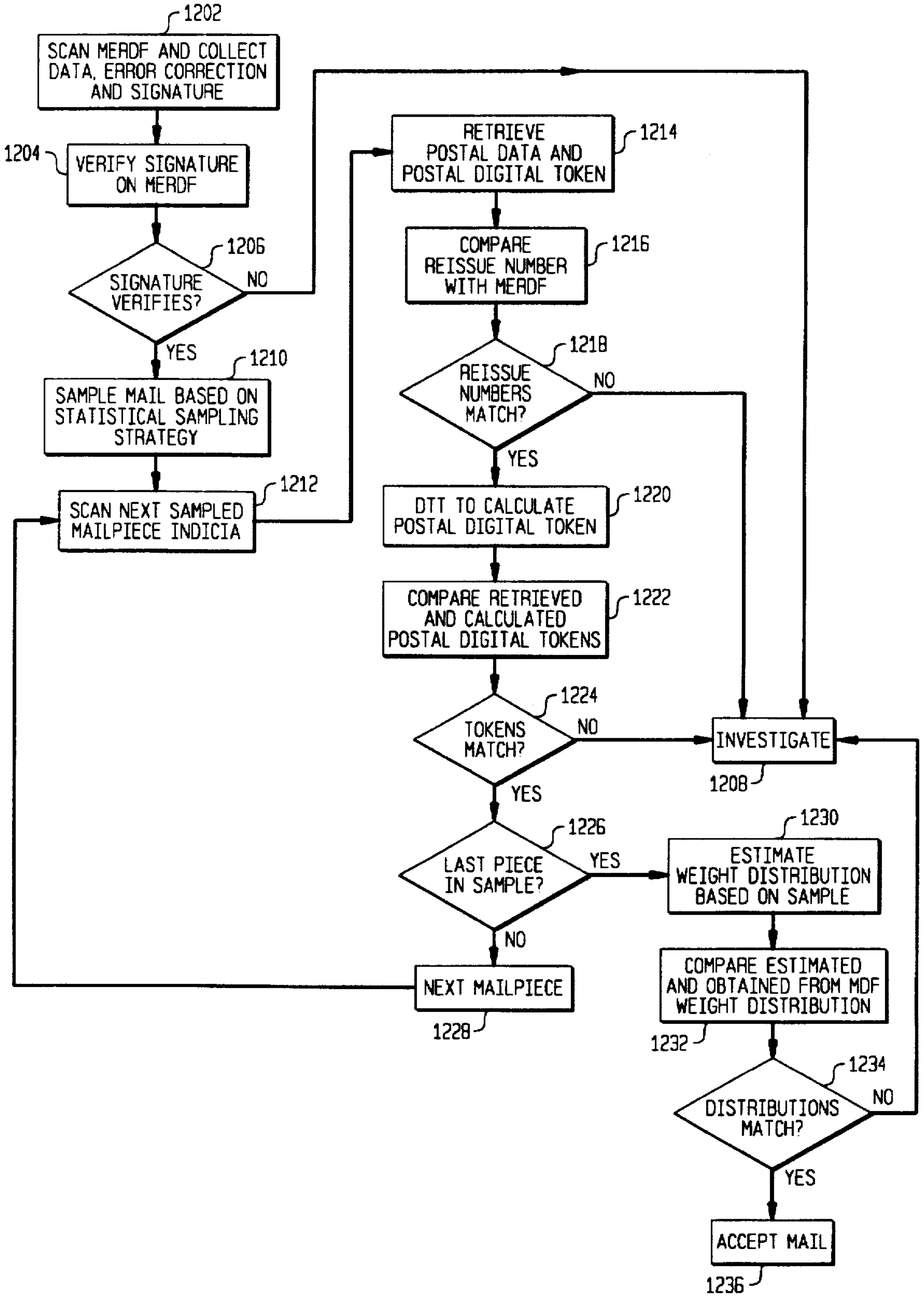

Reference is now made to FIG. 12. The mail error record recovery documentation file is scanned at 1202 to collect data, error correction information and digital signature. The signature on the mail error recovery documentation file is verified at 1204. A determination is made at 1206 if the signature is verified. If not, an investigation is initiated at 1208. If the signatures match, a sample of mail based on a standard statistical sampling strategy is obtained at 1210. The statistical sampling can be any known standard sampling techniques based on the size of the mail run and the number of mailpieces involved and the perceived risk involved. Examples of statistical sampling are disclosed in the text "Statistical Methods" by Snedcor and Cochran, Sixth Edition, 1967, published by the Iowa State University Press.

The verification process of the digital tokens can be done off-line and not necessarily in real time. Verification of digital tokens may be performed at any point during the mail processing and delivery to thereby further reduce the likelihood of collusion. For example, the token verification can be implemented at the delivery point facility as opposed to the point of batch mail submission.

At 1212 the next sampled mailpiece indicia is scanned. The postal data and postal digital token are retrieved at 1214. The reissue number is compared with the mail error documentation file at 1216. A determination is made at 1218 whether the reissue numbers match. If the numbers do not match, an investigation is initiated at 1208. If the numbers match, the digital token transformation is employed to calculate the postal digital token at 1220. The retrieved and calculated digital tokens are compared at 1222. A determination is made at 1224 if the tokens match. If the tokens do not match, an investigation is initiated at 1208. If the tokens do match, a determination is made at 1226 if the mailpiece is the last piece in the sample. If not, the next mailpiece is at 1228 is entered into the sampling process and the process continued at 1212. If on the other hand, the mailpiece is the last piece in the sample, an estimated weight distribution of the sample is calculated at 1230 and a comparison is made at 1232 between the estimated and actual weight distribution obtained from the mail documentation file. The determination is then made at 1234 if the weight distributions match. If a match occurs the mail is accepted at 1236, and if a match does not occur, an investigation is commenced at 1208.

It should be noted that the estimated weight distribution portion of the above described acceptance process is directed at detecting substitution of a high weight mailpieces by multiple lower weight mailpieces. Thus, for example, the sampling is directed to detection of the substitution of two ½ ounce mailpieces (which each may require payment of 32 cents) for a single one ounce mailpiece which would also require a single payment of 32 cents).

It should be recognized that the above described system provides numerous benefits to both the mailer and to the carrier service. The mailer benefits from the utilization of intelligent or encrypted indicia. The indicia is printed on the envelope with a high speed commercially available printer. The indicia may be printed in the address block with display through a windowed envelope if desired. Moreover, the process is highly automated and reduces human interaction in the creation of the mail batch. For example, the generation of the mail documentation file or its equivalent is automatic and does not require further human intervention. The system avoids the use of multiple meters in high production mail processing environment since a single vault may be able to service multiple inserters and the vault may be refilled with postage or carrier funds through a computer meter resetting system.

Additionally, the mailer benefits from the ability to easily implement variable rate mailings and avoids the need for inventory control, extensive documentation, remakes, adjustments and associated fees, while having the benefit of effective funds control. Finally, the system provides the ability to reprint indicia for spoiled mailpieces and provides very significant labor savings which result in improved mail production schedule and mail delivery due to faster mail acceptance.

The carrier service likewise obtains many benefits from the present system. The carrier service enjoys a enhanced revenue protection since there is no incentive to steal vaults (meters) and collusions are easily detectable. The system facilitates the detection of changing the denomination on the mailpiece to higher denomination, and minimizes under estimated payment adjustments while avoiding "washed" stamps and adjustment errors. Because the system is highly automated it simplifies an investigation and provides a strong fraud deterrence effect. The system also provides easy access to the evidence of fraud.

Further advantage to the carrier service involve the computerized transfer of funds, labor savings due to streamlined and uniform acceptance procedure, faster mail processing due to reducing delays in acceptance and simplified administrative controls. The process described in the present invention naturally lends itself for cost effective generation of mailings and corresponding documentation in the case of mailings combined from mailpieces of different classes. For example, in the United States of America mailings of first and third (advertising type) class mail can be combined. However, this requires a very substantial documentation which is costly and prone to errors.

While the present invention has been disclosed and described with reference to the disclosed embodiments thereof, it will be apparent, as noted above, that variations and modifications may be made. For example, the mailer's computer, which contains mailing address lists, can perform address cleansing and send the address list to the inserter in a mail run data file. This file would contain control information for matching the control documents with the corresponding envelopes. This can be done employing, as previously noted, digital tokens which utilize addressee information or do not utilize addressee information. It is, thus, intended in the following claims to cover each variation and modification that falls within the true spirit and scope of the present invention.

What is claimed is:

1. A method for controlled acceptance mail payment and evidencing, comprising the steps of:

creating a mail batch including a plurality of mailpieces each having encrypted indicia printed thereon;

creating a mail documentation file containing the total weight of said mail batch, the total payment for said mail batch and mailer identification, all of which are digitally signed to make a digital signature which facilitates a subsequent verification of the integrity of the data, said digital signature included as part of said mail documentation file;

submitting said mail batch and said mail documentation file to a carrier distribution system; and, processing said mail batch and said mail documentation file as part of the carrier distribution process to determine the total weight of said actual mail batch and verify the weight of said actual mail batch in comparison to the total weight of said mail batch as set forth in said mail documentation file.

2. A method as defined in claim 1 including the further step of verifying the digital signature on said mail documentation file as part of said carrier distribution processing.

3. A method as defined in claim 2 including the further step of including the number of mailpieces in said mail batch having the same actual mailpiece weight within a predetermined weight range, said weight range being a smaller weight range than a carrier payment weight break range.

4. A method as defined in claim 3 wherein said mail documentation file created by each mailer is serialized and said mail documentation file serial number is included as part of said mail documentation file which is digitally signed to enable subsequent verification of the integrity of the data.

5. A method as defined in claim 4 including the further step as part of said carrier distribution process of sampling a portion of said mail batch to determine on a statistical basis if the mailpiece weight distribution corresponds to the mailpiece weights distribution contained in said mail documentation file.

6. A method as defined in claim 5 wherein said sampling process includes the further step of verifying authenticity of said encrypted indicia printed on said sampled mailpieces.

7. A method as defined in claim 6 including the further step of including in said encrypted indicia printed on each mailpiece of the mail batch an indication that said mailpiece is part of a mail batch subject to controlled acceptance processing as part of a carrier distribution process.

8. A method as defined in claim 1 including the further step of creating a substitute mailpiece as part of said mail batch for a spoiled mailpiece and utilizing encrypted indicia associated with said-spoiled mailpiece to provide evidence of payment for said substitute mailpiece.

9. A method as defined in claim 8 including creating a mail error recovery file containing data concerning substitute mailpieces, the mail batch identification and said mailer identification, which are all digitally signed to enable subsequent verification of the integrity of the data in said mail recovery file.

10. A method as defined in claim 1 including a mail container for packaging a portion of said mail batch and the further steps of:

creating at least one grouping of mailpieces from said mail batch to be packaged together in said mail container; and creating a mail container documentation file containing the total weight of said mail grouping and the number of mailpieces in said mail grouping having the same actual mailpiece weight, all of which are digitally signed to make a digital signature which facilitates a subsequent verification of the integrity of the container documentation file data, said digital signature included as part of said mail container documentation file.

11. A method as defined in claim 10 further including the step of generating a mail container documentation file label for attachment to said mail container.

12. A method as defined in claim 11 wherein said label is a machine readable printed label.

* * * * *